(12) United States Patent
Murase

(10) Patent No.: US 8,117,941 B2
(45) Date of Patent: Feb. 21, 2012

(54) PARKING-BRAKE-OPERATION INDICATOR AND METHOD OF ADJUSTING PARKING BRAKE

(75) Inventor: Mikio Murase, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 803 days.

(21) Appl. No.: 11/563,987

(22) Filed: Nov. 28, 2006

(65) Prior Publication Data

US 2007/0151401 A1    Jul. 5, 2007

(30) Foreign Application Priority Data

Nov. 29, 2005   (JP) ................................ 2005-343018

(51) Int. Cl.
*G05G 1/04*   (2006.01)

(52) U.S. Cl. ........................................................ 74/519

(58) Field of Classification Search ................ 74/473.16, 74/473.3, 512, 513, 519, 527, 538, 539, 560, 74/575; 188/2 D; 116/52 A, 202, 58 A
See application file for complete search history.

(56) References Cited

U.S. PATENT DOCUMENTS

| | | | | |
|---|---|---|---|---|
| 3,542,159 A | * | 11/1970 | Kestermeier | 188/72.6 |
| 5,531,136 A | * | 7/1996 | Tyler | 74/523 |
| 6,166,631 A | * | 12/2000 | Kennedy et al. | 340/457.3 |
| 2002/0078780 A1 | | 6/2002 | Kim | |

FOREIGN PATENT DOCUMENTS

| | | |
|---|---|---|
| DE | 4017857 A1 * | 12/1991 |
| GB | 1 311 088 | 3/1973 |
| GB | 2 264 350 A | 8/1993 |
| GB | 2 333 335 A | 7/1999 |
| JP | 60-025841 | 8/1985 |
| JP | 61-85565 | 6/1986 |
| JP | 61-229651 A | 10/1986 |
| JP | 1-109630 U | 7/1989 |
| JP | 2-013860 U | 1/1990 |
| JP | 10-29510 A | 2/1998 |
| JP | 10-252787 A | 9/1998 |
| JP | 2001-225783 A | 8/2001 |
| JP | 2001-310713 A | 11/2001 |

OTHER PUBLICATIONS

European Search Report dated Nov. 7, 2008 issued by European Patent Office for Appl. No. 06124938.9-2423/1790545.

* cited by examiner

*Primary Examiner* — Vicky Johnson
(74) *Attorney, Agent, or Firm* — Locke Lord LLP

(57) ABSTRACT

A parking-brake-operation indicator includes a lever having a pressing portion for pressing a brake disc of a parking brake to press contact the brake disc, a cable operable to draw the lever, a brake-operation tool connected to the cable, a switch for detecting a position of the lever and an indicating means for indicating operation of the parking brake.

8 Claims, 2 Drawing Sheets

# PARKING-BRAKE-OPERATION INDICATOR AND METHOD OF ADJUSTING PARKING BRAKE

BACKGROUND OF THE INVENTION

The present invention relates to a parking-brake-operation indicator for a parking brake that performs braking operation through a cable by manually operating a brake-operation tool of a vehicle. The present invention also relates to a method of adjusting a parking brake in a vehicle having such operation indicator.

Japanese Patent Application Publication No. 60-25841 discloses that in a structure that an operating force of the parking brake is transmitted to the brake portion of the parking brake through a control cable, a signal for the braking force of the parking brake and a signal for inclination of a vehicle are compared and then a signal for driving an indicator is outputted. According to this art, it is confirmed that the parking brake is operated with the braking force corresponding to the inclination of the vehicle when the vehicle is parked on a slope.

Japanese Patent Application Publication No. 60-25841 also discloses a deformation sensor connected to a brake shoe or a brake pad for sensing deformation, a tension sensor for sensing tension of a control cable and a position sensor provided at a parking lever (or a brake-operation tool), as a braking-force sensor for sensing a braking force of the parking brake.

Japanese Utility Model Application Publication No. 61-85565 discloses that a strain gauge is attached to a piston of the brake pad that is connected to the handle of the parking brake and operable to press a brake disc, thereby sensing deformation due to the pressure of the braking pad with respect to the brake disc.

Japanese Utility Model Application Publication No. 61-85565 discloses a structure including an amplifier that outputs amplified electric voltage commensurate with a braking pressure based on resistance change of the strain gauge and a comparator that switches to ON when the outputted electric voltage becomes a reference value or less. According to this structure, an operation lamp is not turned off until locking state is fully released. Thus, the operation lamp indicates to an operator that the parking brake is fully released.

In the above parking brakes, the tension of the cable that connects the brake-operation tool to the parking brake (or the braking portion) may be adjusted in order to adjust the braking force of the parking brake or the operating force of the brake-operation tool.

However, the cable may be excessively tightened depending on the adjustment of the cable tension, which causes narrow clearances between the brake discs of the parking brake. A mechanism for adjusting the cable tension is often located at a distance from the brake discs. Thus, the cable tends to be easily excessively tightened. When the brake discs are not in contact with each other but the clearances therebetween is narrow, drag torque of the parking brake becomes large due to oil viscosity, especially in a wet type multi-disc brake.

In this regard, the braking-force sensor of Japanese Patent Application Publication No. 60-25841 and the strain gauge of Japanese Utility Model Application Publication No. 61-85565 cannot detect that the clearances between the parking discs of the parking brake are narrow.

SUMMARY OF THE INVENTION

According to the present invention, a parking-brake-operation indicator includes a lever having a pressing portion for pressing a brake disc of a parking brake to press contact the brake disc, a cable operable to draw the lever, a brake-operation tool connected to the cable, a switch for detecting a position of the lever and an indicating means for indicating operation of the parking brake.

The present invention also provides a method of adjusting a parking brake in a vehicle that includes a lever having a pressing portion for pressing a brake disc of a parking brake to press contact the brake disc, a spring for urging the lever in a brake-release direction which causes braking of the parking brake to be released, a cable operable to draw the lever and a brake-operation tool connected to the cable. The method includes the steps of providing a switch for detecting a position of the lever to the vehicle; providing an indicating means for indicating state of the switch to the vehicle; adjusting tension of the cable with the brake-operation tool located in its brake position; and confirming that the lever is located in its brake-release position with the brake-operation tool located in its brake-release position.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
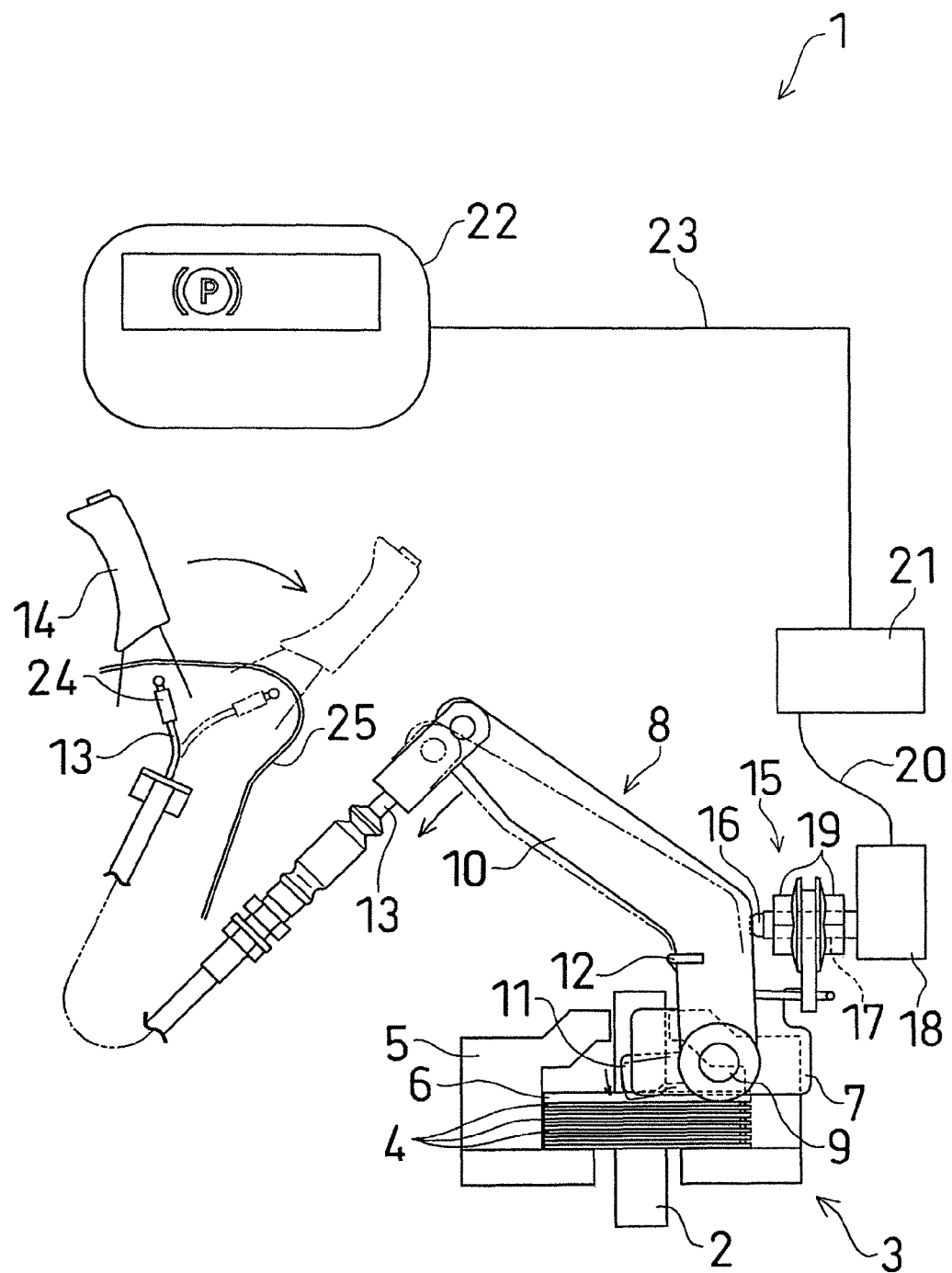
FIG. 1 is a schematic view of a parking-brake-operation indicator according to a preferred embodiment of the present invention.

The following will describe a preferred embodiment. FIG. 1 is a schematic view of a parking-brake-operation indicator according to the preferred embodiment of the present invention.

FIG. 1 illustrates the parking-brake-operation indicator 1 provided in a forklift truck as a vehicle. The forklift truck includes a parking brake 3 for braking a member (a drive shaft 2 in the preferred embodiment) constituting a driving-force-transmission path from an engine (not shown) to wheels (not shown).

The parking brake 3 has a brake housing 5 that partially covers the drive shaft 2 that is rotatably supported at the bottom surface of the forklift truck. Brake discs 4 that are engaged with the drive shaft 2 so as to axially move relative to and so as not to rotate with the drive shaft 2 and brake discs 4 that are engaged with the brake housing 5 so as to axially move relative to and so as not to rotate with the brake housing 5 are alternately arranged in the brake housing 5. The brake housing 5 is filled with lubricating oil, thus the parking brake 3 being formed as a wet type.

A pressing plate 6 is disposed on one side (or an upper side in FIG. 1) of the stacked brake discs 4. A support 7 is located adjacently to the pressing plate 6 for pivotally supporting a lever 8. The support 7 is made of a plate having a bent portion at its appropriate portion. The lever 8 has a base 9 that is rotatably supported by the support 7, a lever body 10 that projects from the base 9 and a fork (or a pressing portion) 11 that projects from the base 9 and whose distal end is located adjacently to the pressing plate 6.

A return spring (or an urging spring) 12 is disposed adjacently to the base 9. The return spring 12 is typically a coil spring that is hitched at one end to the lever body 10 and at the other end to the bent portion of the support 7. Thus, an urging force is constantly applied to the lever body 10 (the lever 8) in a direction that causes the fork 11 not to press the brake discs 4.

A control cable 13 is connected at one end to the distal end of the lever body 10. The control cable 13 passes through inside an instrumental panel 25 that is provided in front of the operator's seat of the forklift truck. The control cable 13 is connected at the other end to a parking brake lever (or a brake-operation tool) 14 that is located adjacently to the operator's seat.

The parking brake lever 14 is of a toggle type that is pivotally moveable between a brake-release position and a brake position. A length adjuster 24 is provided on the part of the control cable 13 that is located inside the instrumental panel 25 adjacently to the connection of the control cable 13 to the parking brake lever 14. The length of the control cable 13 is adjustable by the length adjuster 24. The structure of the length adjuster 24 is various and may be a combination of bolt and nut.

In the preferred embodiment, a switch 15 is provided as a sensor for detecting the position (or a brake-release position) of the lever body 10 of the lever 8 that is indicated by the solid line in FIG. 1. The switch 15 has a contactor 16 that is contactable with the lever body 10, a tubular contactor support 17 that supports the contactor 16 so that the contactor 16 is movable for a certain small stroke and a switch housing 18 that accommodates therein a switch circuit that switches between ON and OFF according to the position of the contactor 16.

An external thread is formed on the outer circumferential surface of the contactor support 17. Two disc nuts 19 are screwed on the external thread of the contactor support 17. The disc nuts 19 respectively have flanges between which the bent portion of the support 7 is sandwiched thereby to fix the contactor support 17 to the support 7. The position where the contactor support 17 is fixed to the support 7 or the position of the switch 15 is adjusted in the axial direction of the contactor support 17 by appropriately rotating the disc nuts 19 on the contactor support 17.

An output-signal cable 20 is drawn from the switch housing 18 of the switch 15 and electrically connected to an indication controller 21. The indication controller 21 is of a microcomputer type having a central processing unit (CPU), a read-only memory (ROM), a random access memory (RAM) and the like. The indication controller 21 is connected through a signal cable 23 to a meter display (or an indicating means) 22 that is disposed adjacently to the operator's seat.

When the switch 15 detects that the lever 8 is located in the position indicated by the solid line in FIG. 1 and switches to OFF, the indication controller 21 controls a "P" lamp (or a warning lamp) of the meter display 22 to be turned off. On the other hand, when the lever 8 is pivoted from the solid-line position anticlockwise as indicated by the arrow in FIG. 1 and the switch 15 detects this and switches to ON, the indication controller 21 controls the "P" lamp of the meter display 22 to be turned on.

When the parking brake lever 14 is located in its brake-release position as indicated by the solid line in FIG. 1, the lever 8 is pivoted by the urging force of the return spring 12 in a brake-release direction which causes braking of the parking brake 3 to be released or clockwise in FIG. 1 so that the lever body 10 contacts with and presses the contactor 16 of the switch 15. Thus, the contactor 16 is pressed to its stroke end as indicated by the solid line in FIG. 1. In other words, the contactor 16 at its solid-line position functions as a stopper to prevent the lever 8 from pivoting further in the brake-release direction.

In the brake-release state of the parking brake 3, the fork 11 of the lever 8 does not press the brake discs 4 through the pressing plate 6. Thus, there are clearances between the brake discs 4 having appropriate intervals, with the result that the drive shaft 2 is not dragged by the brake discs 4 and hence is smoothly rotated. The switch 15 senses that the contactor 16 is pressed and switches to OFF. The indication controller 21 detects this and turn off the "P" lamp of the meter display 22. Therefore, an operator at the operator's seat notices that the parking brake 3 is not operated by confirming that the "P" lamp is turned off.

During a stop of the vehicle, the operator puts his or her hand on the parking brake lever 14 and pulls it in the direction of the arrow in FIG. 1. Accordingly, the lever body 10 of the lever 8 is drawn through the control cable 13 and the lever 8 is pivoted on the base 9 anticlockwise or in the direction of the arrow in FIG. 1. The lever body 10 moves away from the contactor 16 of the switch 15 and the fork 11 presses the brake discs 4 through the pressing plate 6. Thus, the clearances between the brake discs 4 disappear and the brake discs 4 are brought into press contact with each other, thereby providing a friction braking force to the drive shaft 2. In this state, the parking brake lever 14 is locked by an appropriate lock mechanism, so that the vehicle is braked so as not to move despite the intention of the operator.

In the brake state of the parking brake 3, the pressed contactor 16 is released and moved by a return spring (not shown) leftward in FIG. 1 from the pressed position so that the switch 15 switches to ON. The indication controller 21 detects this and turns on the "P" lamp of the meter display 22. Therefore, it is indicated to the operator at the operator's seat that the parking brake 3 is operated.

The following will describe process for adjusting the operating force of the parking brake lever 14 and the braking force of the parking brake 3 in the above structure. The adjustment is carried out by accessing to the inside of the instrumental panel 25 and screwing the length adjuster 24 onto the control cable 13.

More specifically, the parking brake lever 14 is inclined to its brake position indicated by the chain double-dashed line in FIG. 1. In this state, the length adjuster 24 is screwed onto the control cable 13 to adjust the tension of the control cable 13 so that a desired braking force at the brake discs 4 is obtained.

When the braking force of the parking brake 3 is desired to be increased because the vehicle is often used on slopes, the length adjuster 24 may be excessively screwed onto the control cable 13. If so, the lever 8 may be still dragged by the control cable 13 in the brake direction even when the parking brake lever 14 is returned to its brake-release position. Thus, the clearances between the brake discs 4 are excessively small and hence drag torque becomes large.

In this regard, in this adjustment process, the parking brake lever 14 is returned to its brake-release position and it is confirmed that the "P" lamp of the meter display 22 is turned off after the above screwing work. If the "P" lamp is not turned off after the parking brake lever 14 is returned to its brake-release position, this means that the lever body 10 is separated from the switch 15 due to the excessive tension of the control cable 13, namely, that the lever 8 fails to be returned to its brake-release position thereby to make the clearances between the brake discs 4 narrow. In this case, the length adjuster 24 is readjusted so that the excessive tension of the control cable 13 is released and it is reconfirmed whether the "P" lamp is turned off with the parking brake lever 14 located in its brake-release position. By so doing, the braking force of the parking brake is appropriately adjusted while the appropriate clearances between the brake discs 4 are ensured in the brake-release state of the parking brake 3.

As mentioned above, the parking-brake-operation indicator 1 of the preferred embodiment includes the lever 8 having the fork 11 for pressing the brake discs 4 of the parking brake 3 to press contact the brake discs 4, the control cable 13 operable to drag the lever 8, the parking brake lever 14 connected to the control cable 13, the switch 15 for detecting the position of the lever 8 and the meter display 22 for indicating the operation of the parking brake 3 according to the state of the switch 15.

Forgetting to release the parking brake 3 is indicated and the excessively narrow clearances between the brake discs 4 is known. Therefore, drag torque is prevented from becoming large by driving the vehicle without knowing that the clearances between the brake discs 4 are excessively narrow.

The parking-brake-operation indicator 1 of the preferred embodiment includes the return spring 12 for urging the lever 8 in the brake-release direction, and the switch 15 is configured to restrict the movement of the lever 8 in the brake-release direction by the contactor 16 in a state of contacting with the lever 8.

Therefore, one end of the pivot stroke of the lever 8 is restricted by the switch 15. Thus, a particular restricting element need not be provided and the structure is made simpler. The one end of the pivot stroke of the lever 8, namely, the brake-release position of the lever 8 indicated by the solid line in FIG. 1 is certainly detected by the switch 15.

In the preferred embodiment, the position of the contactor 16 (or the switch 15) is adjusted by rotating the disc nuts 19, thereby adjusting the brake-release position of the lever 8.

Therefore, the brake-release position of the lever 8 is adjusted through a simple structure. It is considered that the adjustment of the brake-release position of the lever 8 is carried out just before shipment of the vehicle or depending on abrasion of the brake discs 4.

In the preferred embodiment, the parking brake is adjusted as follows. With the parking brake lever 14 inclined in its brake position indicated by the chain double-dashed line in FIG. 1, the tension of the control cable 13 is adjusted. Then, the parking brake lever 14 is inclined to its brake-release position indicated by the solid line in FIG. 1 and it is confirmed that the "P" lamp of the meter display 22 is turned off to ensure that the lever 8 is located in its brake-release position indicated by the solid line in FIG. 1.

Therefore, the press contact of the brake discs 4, namely, the braking force of the parking brake 3 is appropriately adjusted by adjusting the tension of the control cable 13 with the parking brake lever 14 located in its brake position. Meanwhile, the parking brake lever 14 is inclined to its brake-release position and the "P" lamp of the meter display 22 is confirmed, thereby certainly preventing the excessively narrow clearances between the brake discs 4 due to the excessive tension of the control cable 13. The meter display 22 of the preferred embodiment is located adjacently to the instrumental panel 25. Thus, the length of the clearances between the brake discs 4 is easily confirmed by the meter display 22 in comparison with the case of actually looking at the inside of the brake housing 5 located at the bottom surface of the forklift truck.

Although the preferred embodiment is described above, it is merely one example and the present invention is modified as exemplified below.

As the indicating means, the shape of the warning lamp of the meter display 22 is not limited to that as shown in FIG. 1 but may have an arbitrary shape. Instead of or in addition to the meter display 22 (or the warning lamp) optically indicating, a buzzer may be used for indicating the operation of the parking brake 3 with a sound. The brake-operation tool is not limited to the parking brake lever 14 but a pedal type tool may be used.

Figure 2:
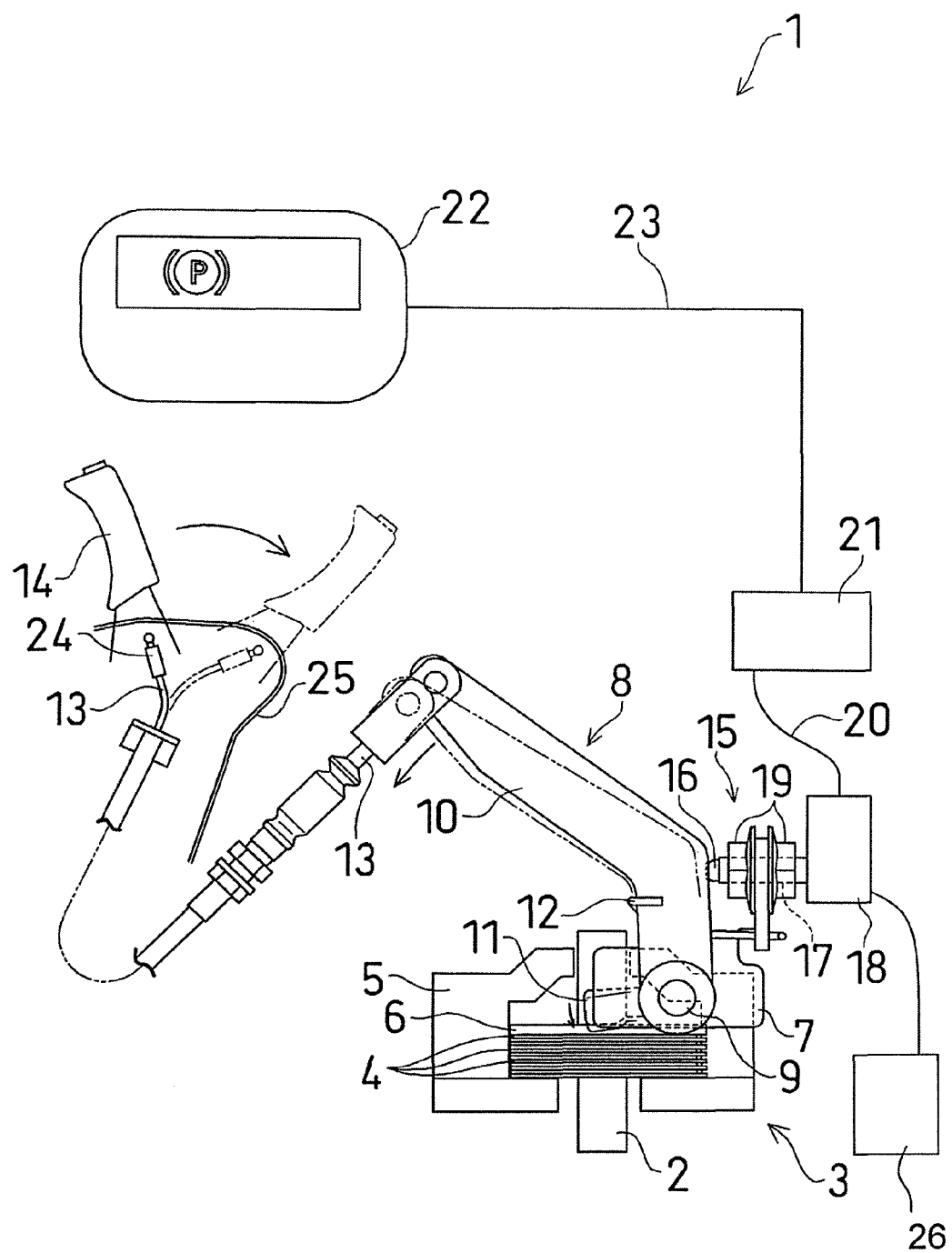
FIG. 2 is a schematic view of a parking-brake-operation indicator according to an alternative embodiment of the present invention.

The ON/OFF signal of the switch 15 may be outputted not only to the indication controller 21 but also to a traveling controller 26 for controlling traveling of the vehicle as shown in FIG. 2. In this case, when the switch 15 is in ON state (the parking brake 3 performs braking or the clearances between the brake discs 4 are narrow), the traveling controller 26 performs control such as stopping drive of the vehicle or limiting vehicle speed even when an accelerator is operated. Thus, trouble such as seizure of the parking brake 3 is prevented. The signal indicating the state of the switch 15 is outputted to the traveling controller 26 directly as shown in FIG. 2, but alternatively via the indication controller 21.

In the preferred embodiment, the switch 15 switches to OFF when the contactor 16 is pressed by the lever body 10 and to ON when the pressing of the contactor 16 is released. However, the switch is not limited to this type but may operate in the reversed manner, that is, the switch may switch to ON when the contactor 16 is pressed and to OFF when the pressing is released. The other part or element other than the lever body 10 may be contactable with the contactor 16 to make the switch 15 switch to ON or OFF.

In the preferred embodiment, the switch 15 switches to OFF by pressing the contactor 16 for a certain stroke. However, the switch is not limited to this type. For example, the contactor is immovable and fixed, and the lever body 10 is made of an electric conductor. When the contactor and the lever body 10 contact with each other, an electricity-conducting signal is outputted to the indication controller 21.

The position adjustment mechanism of the switch 15 is not limited to the combination of the thread of the contactor support 17 and the disc nuts 19. For example, the position where the switch housing 18, not the contactor support 17, is fixed is adjusted to adjust the position of the contactor 16.

The parking brake 3 may be changed from the wet type multi-disc parking brake into a dry type or a single-disc type. The above parking-brake-operation indicator is applicable to vehicles including industrial vehicles other than forklift trucks.

Therefore, the present examples and embodiments are to be considered as illustrative and not restrictive, and the invention is not to be limited to the details given herein but may be modified within the scope of the appended claims.

What is claimed is:

1. A parking-brake-operation indicator comprising:
    a lever having a pressing portion for pressing a brake disc of a parking brake to press contact the brake disc;
    a cable connected and operable to draw the lever;
    a brake-operation tool connected to the cable;
    a spring for urging the lever in a brake-release direction which causes braking of the parking brake to be released;
    a switch for detecting a brake-release position and a brake position of the lever having a contactor contactable with the lever, the contactor actuates the switch between an on-position and an off-position based on a state of contacting with the lever, the switch being configured to restrict movement of the lever in the brake-release direction in a state of contacting with the lever; and an indicating means for indicating operation of the parking brake based on the on-position or off-position of the switch.

2. The parking-brake-operation indicator according to claim 1, wherein the switch is configured to adjust its position so that a brake-release position of the lever is adjusted.

3. The parking-brake-operation indicator according to claim 1, wherein the switch is configured to output a signal to a controller that controls traveling of a vehicle.

4. The parking-brake-operation indicator according to claim 1, wherein the lever has a lever body contactable with the switch, the pressing portion projecting from the lever body.

5. A method of adjusting a parking brake in a vehicle that includes a lever having a pressing portion for pressing a brake disc of a parking brake to press contact the brake disc, a spring for urging the lever in a brake-release direction which causes braking of the parking brake to be released, a cable connected and operable to draw the lever and a brake-operation tool connected to the cable, the method comprising the steps of:

providing a switch for detecting a brake-release position and a brake position of the lever to the vehicle having a contactor contactable with the lever, the contact actuates the switch between an on-position and an off-position based on a state of contacting with the lever;

providing an indicating means for indicating state of the switch to the vehicle;

adjusting tension of the cable with the brake-operation tool located in its brake position; and confirming that the lever is located in its brake-release position with the brake-operation tool located in its brake-release position.

6. A parking-brake-operation indicator comprising:

a lever having a pressing portion for pressing a brake disc of a parking brake to press contact the brake disc;

a cable connected and operable to draw the lever;

a brake-operation tool connected to the cable;

a switch for detecting a position of the lever having a contactor contactable with the lever, the switch includes a tubular contactor support which has an external thread formed on its outer circumferential surface, two disc nuts being screwed on the external thread of the contactor support; wherein the switch is configured to adjust its position so that a brake-release position of the lever is adjusted;

a spring for urging the lever in a brake-release direction which causes braking of the parking brake to be released, wherein the switch being configured to restrict movement of the lever in the brake-release direction in a state of contacting with the lever; and an indicating means for indicating operation of the parking brake.

7. The parking-brake-operation indicator according to claim 6, further comprising a support for supporting the lever, the support having a bent portion which is sandwiched between the disc nuts so that the contactor support is fixed to the support.

8. A parking-brake-operation indicator comprising:

a lever having a pressing portion for pressing a plurality of brake discs of a parking brake to press contact the brake disc;

a cable connected and operable to draw the lever;

a brake-operation tool connected to the cable;

a switch for detecting a position of the lever having a contactor contactable with the lever;

a length adjuster provided on the cable adjacently to a connection of the cable to the brake-operation tool for adjusting a length of the cable; and an indicating means for indicating that the lever is dragged by the cable in the brake direction if the brake-operation tool is in the brake-release position.

* * * * *